United States Patent [19]

Hodge

[11] 4,092,644
[45] May 30, 1978

[54] DIGITAL WEATHER RADAR INCLUDING TARGET SEVERITY ANALYSIS CAPABILITY

[75] Inventor: Richard M. Hodge, Marion, Iowa

[73] Assignee: Rockwell International Corporation, El Segundo, Calif.

[21] Appl. No.: 780,942

[22] Filed: Mar. 24, 1977

[51] Int. Cl.² .............................................. G01S 9/60
[52] U.S. Cl. ................................................... 343/5 W
[58] Field of Search ...................................... 343/5 W

[56] References Cited

U.S. PATENT DOCUMENTS

| 3,149,332 | 9/1964 | Kocher | 343/5 W X |
| 3,447,153 | 5/1969 | Maguire | 343/5 W |

Primary Examiner—T.H. Tubbesing
Attorney, Agent, or Firm—Terry M. Blackwood; Robert J. Crawford; L. Lee Humphries

[57] ABSTRACT

A digital weather radar system having a mode that clears the display of all clutter and lighter precipitation to reveal or positively present only the contoured areas, i.e., the severe "cores" or "hard spots." Data representative of the searched space is stored at least temporarily in a digital memory. In the preferred embodiment, a controllable decoder operates on this data according to the particular decoder state selected, the decoder output is D/A converted, and the resultant analog signal is used to intensity modulate a cathode ray tube (CRT).

11 Claims, 6 Drawing Figures

DIGITAL WEATHER RADAR INCLUDING TARGET SEVERITY ANALYSIS CAPABILITY

This invention relates to a digital weather radar and more particularly to weather severity discernment.

Airborne weather radars have traditionally incorporated a type of visible presentation wherein the target echos from a given searched area are presented on a viewing screen as a picture whose intensity increases in proportion to the severity or degree of precipitation encountered by the search beam. Due to the limited dynamic range of the high retentivity, storage type CRT's commonly used for radar display, this type of presentation has proved of minimal value to the operator who must analyze and interpret the picture to determine the weather severity. More particularly, storage tube display devices provide little contrast between targets of different magnitude and permit little discernment of the areas of most intense weather.

The isoecho-contour display evolved as a means for overcoming this lack of contrast problem. In the isoecho-contour display only the target magnitudes producing echo strengths above mds (minimum discernible signal) and below a predetermined threshold are positively painted on the viewing screen. That is, only those return levels between mds and a predetermined threshold are presented as light areas. Target magnitudes above the predetermined threshold and target magnitudes below mds appear as black or dark areas on the viewing screen. Also, from the width of the light areas, the viewer can estimate the rainfall gradient and thus the degree of turbulence. A variation of this display technique involves positively painting on the screen only the lowest magnitude and the next to highest magnitude, while the highest magnitude and the next to lowest magnitude both appear as dark areas on the screen. For additional details on the contour type display see (i) Merrill I. Skolnik's book "Introduction to Radar Systems" Pages 582, 583, McGraw Hill 1962 (ii) U.S. Reissue Pat. No. 24,084, and (iii) U.S. Pat. No. 2,996,678.

In the isoecho-contour type display an ambiguity in presentation exists. That is, the safe areas and the dangerous areas appear the same; i.e., as dark areas on the screen. In an attempt to resolve this ambiguity several radars provide alternate presentations of contoured pictures and non-contoured pictures. However depending on several variables such as range and azimuth resolution capability of the radar, storm geometry, and storm intensity gradient, the total presentation can still be misleading or at least can require more time to correctly interpret than the pilot can or should spend during periods of heavy workload.

A further technique occasionally used by some pilots but considered as poor practice by several of those skilled in the art involves reducing the RF gain. Reducing the RF gain eliminates the lower intensity targets from the presentation but also reduces the intensity and the contrast with which the remaining targets are displayed and can thus mislead the viewer as to their absolute strength. Moreover, due to pilot workload the gain can be reduced and forgotten thus causing the pilot to later misinterpret the data presented. Thus this technique is far from foolproof and can also require more time than should be devoted during periods of heavy workload.

In accordance with the present invention there is provided a weather radar system including a nonambiguous presentation which permits an extremely quick, highly accurate, and foolproof analysis of weather severity. These and other features, objects, and advantages of the invention will become more apparent upon reference to the following specification, claims, and appended drawings in which:

Figure 1:
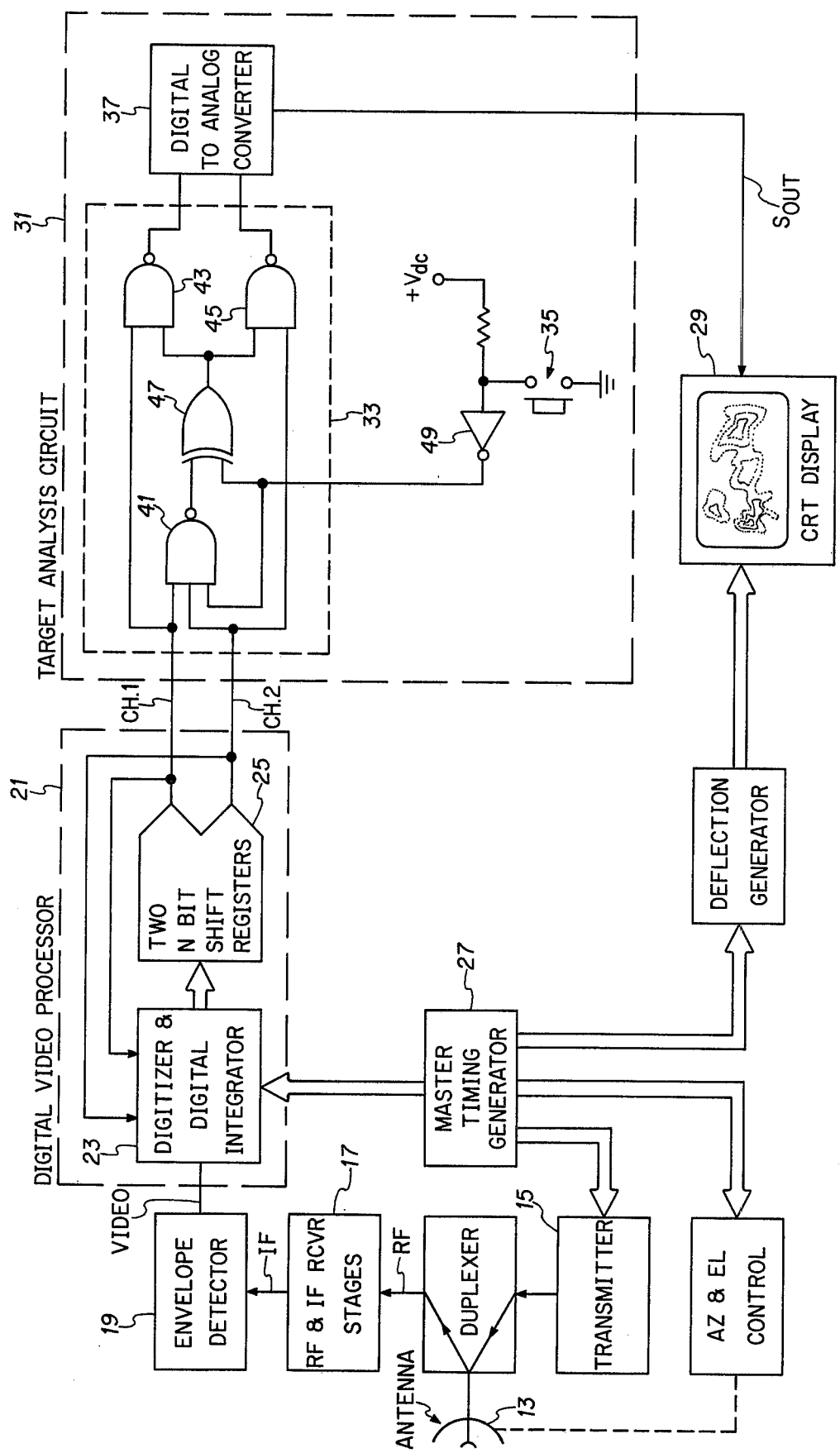
FIG. 1 is a combination block circuit diagram and detailed circuit schematic illustrating the presently preferred inventive embodiment.

In the system illustrated in FIG. 1, antenna 13 is presently caused to scan 90° in azimuth substantially in 90 regularly occurring 1° increments, the rate of incrementing being approximately 24Hz. For each 1° antenna increment or azimuth position there are four regularly occurring pulse periods. During any one pulse period, transmitter 15 is caused to emit a radar pulse, and following the transmission the radar return therefrom is processed at RF and IF in 17 and the amplitude detected in 19. The resultant video is then processed in the digital video processor 21 as follows.

Generally, in item 23, each of the four video returns is digitized, the four are then accumulated or summed together, and this accumulation further summed with digital data representative of the "line of data" which corresponds to the same antenna position but which was derived during the next preceding antenna scan. Herein, the terms line, line of display, line of information, or line of data, will be used to indicate the information displayed, or the data used in displaying, during one outward sweep with range of the display CRT electron beam. A new line of digital data representative of the total sum is then entered in memory 25 at the address corresponding to this azimuth position. That is, the total sum becomes a new line of data and replaces the old line of data for this azimuth position.

More particularly each of the four returns from a particular azimuth position are in turn digitized at a predetermined bit rate into 128 serially occurring two-parallel-bit digital words. The time interval per bit corresponds of course to one range resolution interval, and 128 bit time intervals correspond to the maximum radar range. These four digitized returns are summed such that the resultant word for any particular bit time comprises the sum of the four digital words for that particular bit time. The resultant is of course 128 serially occurring digital words. To this sum is also added 128 words representative of the line of data stored in memory 25 which corresponds to the same antenna position but which was derived during the next preceding antenna scan. At a time compatible with similar processing for the next antenna position, a line of data representative of this total sum and comprising 128 two-parallel-bit digital words is entered into memory 25 as the new line of data for this particular azimuth position, replacing the old line of data therein.

At any particular point in time, memory 25, which comprises two 11,520 bit shift registers operating in parallel, contains 90 different lines of data which correspond respectively to the 90 different antenna azimuth positions, and any particular line comprises 128 two-parallel-bit digital words which correspond respectively to the 128 different range intervals. For instance, the 23rd line of data represents the space searched or interrogated by the radar at the 23rd antenna azimuth position, and the 41st digital word of the 23rd line of data represents the target magnitude at the 41st range interval along antenna azimuth position 23.

The presently preferred method of presentation generation is to generate or paint the information on the CRT as it becomes available at the memory output. Since the entire 90 lines of data are recirculated in memory 25 once each pulse period, this results in the generating, per pulse period, of one complete picture of all 90 lines of memory data. As shown in FIG. 1 timing coordination for transmitting, antenna incrementing, digital processing, and CRT deflection, is provided by master timing generator 27.

The digital video processor 21 is the subject of U.S. Pat. application Ser. No. 720,165 entitled Radar Signal Processor and assigned to the assignee of the present invention. For additional detail on the processor 21, the system portions preceding same, the timing coordination and other such background of the present invention, said application is hereby incorporated by reference into the present disclosure.

In accordance with the present invention and the preferred embodiment thereof, the data available at the memory 25 output is visually presented on the face of CRT 29 in accordance with the state of target analysis circuit 31. More particularly each two-parallel-bit digital word appearing at memory 25 output is one of the four words 00, 01, 10, or 11. As presently assigned, the memory word 11 represents the largest target magnitudes and more particularly represents targets whose magnitude is equal to or greater than contour threshold. (Contour threshold or isoecho-contour threshold is an industry standard term used to define an absolute level of storm severity or intensity; e.g., a particular rainfall rate. See ARINC CHARACTERISTIC 564-1 by Aeronautical Radio, Inc., issued Nov. 1, 1967, Section 3.7.) Also as presently assigned the memory word 00 represents target magnitudes below system mds, the memory word 01 represents target magnitudes from mds to a predetermined intermediate level, and the memory word 10 represents target magnitudes from said intermediate level to the contour level or threshold. Typically the rainfall rate represented by the intermediate level is approximately 25% to 50% of the rainfall rate represented by the contour level. The four different memory output words are converted into new digital words by the controllable decoder 33. This conversion depends on whether operator-controllable switch 35 is open or closed and is defined in the table below.

TABLE

| Memory 25 Digital Word Out | | Decoder 33 Digital Word Out (Switch 35 Open) | | Decoder 33 Digital Word Out (Switch 35 Closed) | |
|---|---|---|---|---|---|
| Ch. 1 | Ch. 2 | Gate 43 Out | Gate 45 Out | Gate 43 Out | Gate 45 Out |
| 0 | 0 | 1 | 1 | 1 | 1 |
| 0 | 1 | 1 | 0 | 1 | 1 |
| 1 | 0 | 0 | 1 | 1 | 1 |
| 1 | 1 | 0 | 0 | 0 | 0 |

Figure 2:
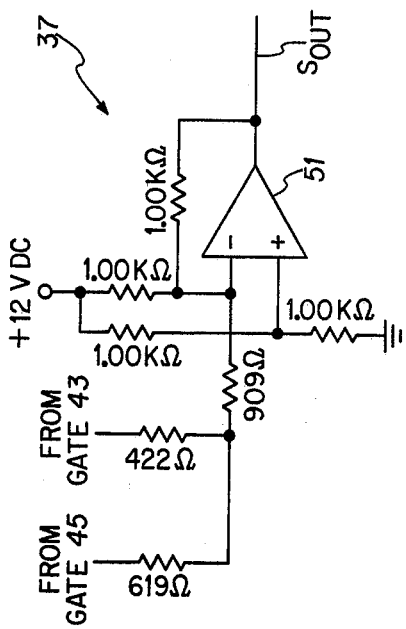
FIG. 2 is a circuit schematic showing item 37 of FIG. 1 in more detail.

The decoder 33 digital words out are converted by D/A converter 37 into an analog signal $S_{out}$ suitable for controlling or modulating the electron beam intensity (i.e., the Z axis) of the CRT 29. As shown in FIG. 1 controllable decoder 33 presently comprises three NAND gates 41, 43, and 45, and one EXCLUSIVE OR gate 47. Gates 43 and 45 are of the type whose logic 0 output corresponds substantially to ground potential and whose logic 1 output corresponds to an open circuit. Item 49 is an inverter which outputs a logic 0 when switch 35 is open and outputs a logic 1 when switch 35 is closed. The presently employed D/A converter 37 is shown in FIG. 2. Item 51 is a differential input operational amplifier.

Figure 3:
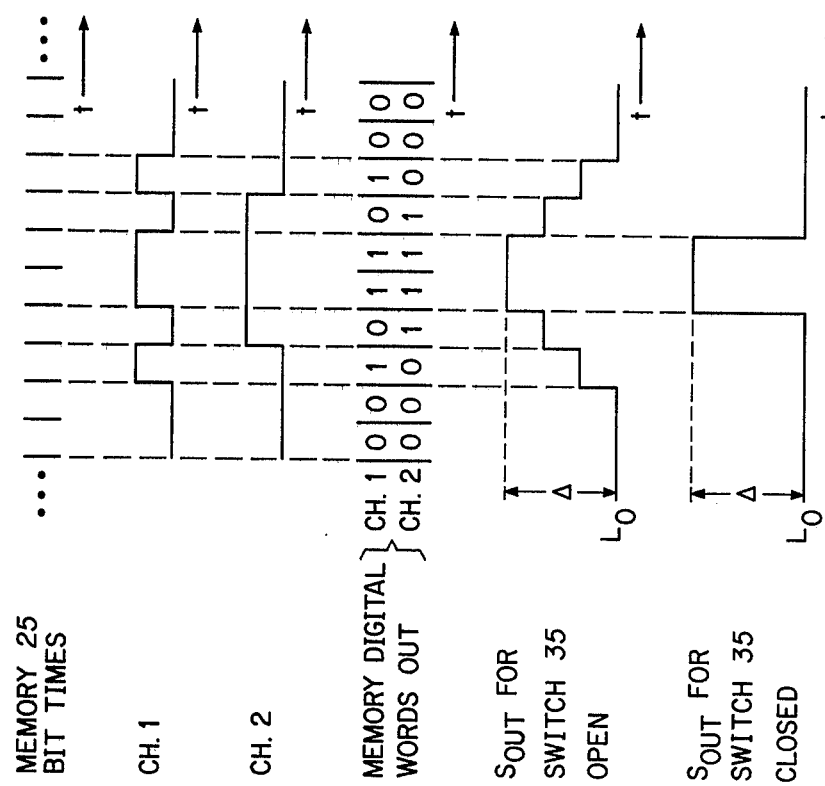
FIG. 3 shows waveforms useful in explaining the operation of item 31 in FIG. 1.

The waveforms of FIG. 3 represent a typical conversion by target analysis circuit 31 of input digital words from memory 25 into the CRT intensity-controlling analog signal output $S_{out}$. Therefrom it should be noted that, for the switch 35 open condition, the memory words which correspond to the largest target magnitudes (i.e., all memory words 11) are each converted to the highest $S_{out}$ level and thus result in the highest intensity areas on the CRT. The memory words corresponding to the target magnitudes below mds (i.e., all memory words 00) are each converted to the lowest $S_{out}$ level $L_o$ and thus result in the dark areas on the CRT. The memory words corresponding to the second and third largest target magnitudes (i.e., 10 and 01) are converted respectively to second and third highest $S_{out}$ levels and thus result in the second and third brightest intensity levels respectively on the CRT. In other words all target magnitudes above system mds are represented as light areas whose intensity increases as a monotonic function of target magnitude.

It should also be noted from FIG. 3 that for the switch 35 closed condition all memory words which correspond to target magnitudes less than the contour level are converted to the lowest $S_{out}$ level and thus result in dark areas on the CRT. Significantly, the memory words which correspond to the largest target magnitudes (i.e., contour level or above) are still converted to the highest $S_{out}$ level and thus result in areas on the CRT of the same intensity as for the switch 35 open condition. More particularly, in the switch 35 closed condition, memory words 00, 01, and 10 are prevented from contributing to the light pattern on the CRT, and memory words 11 still appear on the CRT unaffected in image size or brightness.

Figure 4:
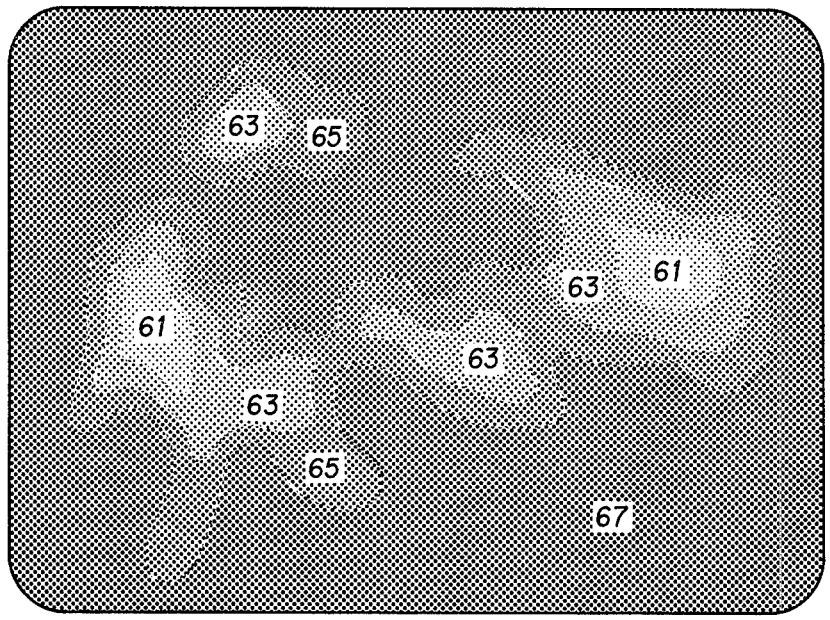
FIGS. 4 and 5 illustrate typical radar screen presentations produced by the system herein.
Figure 5:
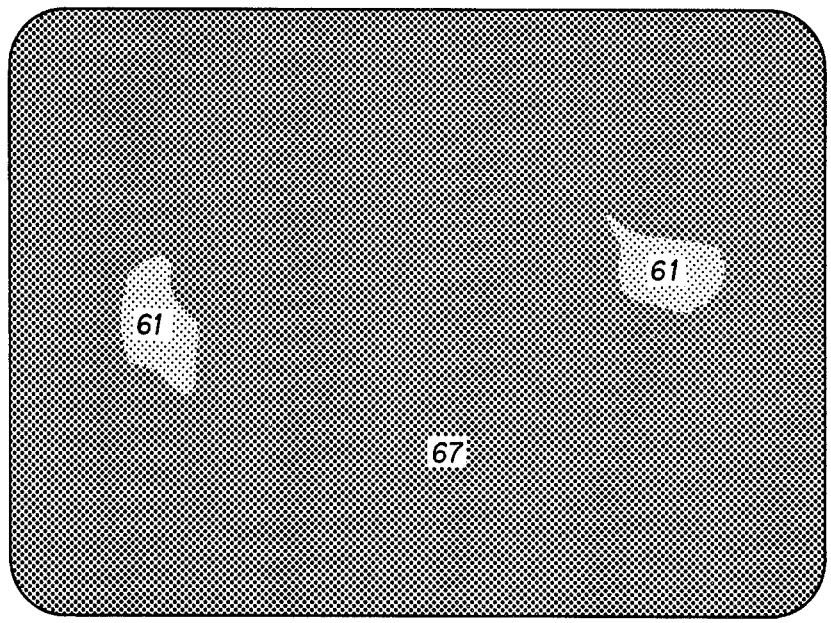

The difference between switch 35 open and closed conditions is also represented in FIGS. 4 and 5. FIG. 4 represents a CRT screen displaying a particular searched space and targets therein, and assumes switch 35 is open. FIG. 5 assumes the same conditions as FIG. 4 with the exception that switch 35 is closed. In FIG. 4 the lightest area 61 represents the target magnitude above contour level; the 2nd and 3rd lightest areas 63 and 65 respectively represent the 2nd and 3rd target magnitude levels; and the darkest area 67 represents the target magnitudes below mds. In FIG. 5 the lighest area 61 represents the target magnitudes above contour level; and the darkest area 67 represents the target magnitudes below contour level. As seen from FIGS. 4 and 5 the severe "core" of the target appears identical in both figures. The second and third levels which appear in FIG. 4 are however eliminated from view in FIG. 5. As earlier mentioned, a complete picture is painted every pulse period or more particularly at a 96Hz rate, and thus the time of transition from FIG. 1 to FIG. 2 (approximately 10 milliseconds) is essentially instantaneous to the viewer.

Thus, with all returns except those at contour level and above eliminated from view, and with the contour and higher level returns still displayed at the same intensity, an unambiguous representation of high contrast is instantly available to permit the pilot to quickly locate the severe storm cores and plan a judicious route around them.

Figure 6:
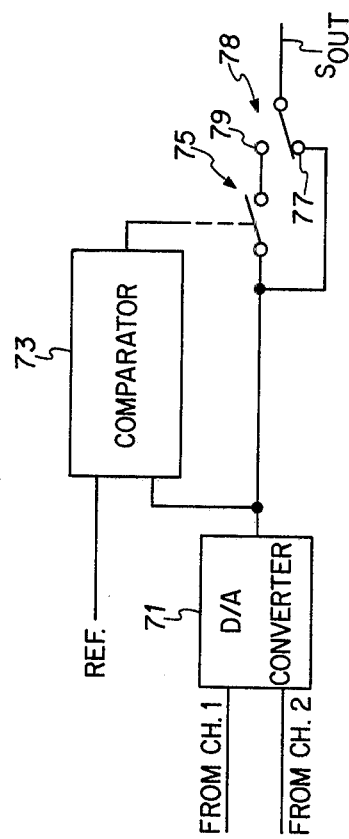
FIG. 6 is a circuit diagram illustrating an alternative embodiment for item 31 in FIG. 1.

It should be apparent that the target analysis circuit 31 may be variously embodied. One alternative embodiment is shown in FIG. 6. Therein an appropriate D/A converter 71 converts the four different memory output words into four different and corresponding analog levels. Comparator 73 closes switch 75 only when the converter 71 analog output exceeds an appropriate reference. For the FIG. 3 inputs, the waveform at pole 77 of switch 78 would appear essentially identical to the FIG. 3 $S_{out}$ waveform for switch 35 open conditions, and the waveform at pole 79 of switch 78 would appear essentially identical to the FIG. 3 $S_{out}$ waveform for switch 35 closed conditions. Selection between the two poles is of course afforded by switch 78 and thus the actual form of $S_{out}$, and the actual presentation, would depend on the state of switch 78.

Thus, while particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

What is claimed is:

1. In a radar system of the type including (i) means for receiving echo signals from targets in a searched space, (ii) means for producing, from the received echo signals, digitally formatted data representative of the searched space, and (iii) digital memory means for storing said digitally formatted data for a predetermined time, the improvement comprising:

multiple state conversion means, including circuit means and display means, for converting said stored data into different visible light patterns in accordance with the state of said conversion means without affecting the gain (i.e., sensitivity) of said means for receiving, said conversion means, when in a first state, converting said stored data into a light pattern wherein all target magnitudes below a predetermined magnitude $M_L$ are represented as dark areas and all target magnitudes greater than $M_L$ are represented as light areas, said conversion means, when in a second state, converting said stored data into a light pattern wherein all target magnitudes below a predetermined magnitude $M_T$, where $M_T > M_L$, are represented as dark areas and all target magnitudes greater than $M_T$ are represented as light areas substantially the same as they would be represented in the first state light pattern.

2. The radar system as defined in claim 1 wherein said conversion means comprises means for converting when said conversion means is in said first state said data into a light pattern wherein all target magnitudes below said predetermined magnitude $M_L$ are represented as dark areas and all target magnitudes greater than $M_L$ are represented as light areas whose intensity increases as a monotonic function of target magnitude.

3. The radar system as defined in claim 2 wherein said magnitude $M_L$ corresponds to the radar system mds.

4. The radar system as defined in claim 2 wherein $M_T$ is substantially equal to contour level.

5. The radar system as defined in claim 1 wherein said means for producing digitally formatted data comprises means for producing a data array of digital words wherein each digital word is (i) representative of target magnitude for a predetermined portion of said searched space and (ii) one of P different digital words.

6. The radar system as defined in claim 1 wherein said means for producing digitally formatted data comprises means for producing a data array of digital words wherein each digital word is (i) representative of target magnitude for a predetermined portion of said searched space and (ii) one of 4 different digital words.

7. The radar system as defined in claim 1 wherein said means for producing digitally formatted data comprises means for producing a data array of digital words wherein each digital word is (i) representative of target magnitude for a predetermined portion of said searched space and (ii) one of 4 different two-parallel-bit digital words.

8. The radar system as defined in claim 5 wherein said circuit means comprises means for converting said data into a light intensity control signal comprising analog signal levels corresponding in a predetermined manner to said digital words, said circuit means outputting, for said first state, (i) dark-area-producing analog signal levels for all inputted digital words representative of target magnitudes less than $M_L$, and (ii) light-area-producing analog signal levels for all inputted digital words representative of target magnitudes greater than $M_L$, said circuit means outputting for said second state, (i) dark-area-producing analog signal levels for all inputted digital words representative of target magnitudes less than $M_T$, and (ii) light-area-producing analog signal levels for all inputted digital words representative of target magnitudes greater than $M_T$.

9. The radar system as defined in claim 1 wherein said display means comprises a cathode ray tube (CRT).

10. The radar system as defined in claim 1 wherein said magnitude $M_L$ corresponds to the radar system mds.

11. Apparatus as defined in claim 1 wherein $M_T$ is substantially equal to contour level.

* * * * *